(12) United States Patent
Dmitriev et al.

(10) Patent No.: US 11,257,472 B2
(45) Date of Patent: Feb. 22, 2022

(54) HYDROACOUSTIC DEVICE

(71) Applicant: UNDERWATER COMMUNICATIONS & NAVIGATION LABORATORY (LIMITED LIABILITY COMPANY), Moscow (RU)

(72) Inventors: Stanislav Mikhailovich Dmitriev, Volgograd (RU); Alexander Vasilievich Dikarev, Volgograd (RU)

(73) Assignee: UNDERWATER COMMUNICATIONS & NAVIGATION LABORATORY (LIMITED LIABILITY COMPANY), Moscow (RU)

( * ) Notice: Subject to any disclaimer, the term of this patent is extended or adjusted under 35 U.S.C. 154(b) by 180 days.

(21) Appl. No.: 15/739,249

(22) PCT Filed: May 12, 2016

(86) PCT No.: PCT/RU2016/050009
§ 371 (c)(1),
(2) Date: Dec. 22, 2017

(87) PCT Pub. No.: WO2016/209119
PCT Pub. Date: Dec. 29, 2016

(65) Prior Publication Data
US 2018/0190255 A1  Jul. 5, 2018

(30) Foreign Application Priority Data

Jun. 26, 2015 (RU) .......................... RU2015125364

(51) Int. Cl.
*G01V 1/16* (2006.01)
*G10K 9/08* (2006.01)
(Continued)

(52) U.S. Cl.
CPC ................ *G10K 9/08* (2013.01); *G01S 1/72* (2013.01); *G01S 1/75* (2019.08); *G01S 3/80* (2013.01); *G01S 7/521* (2013.01); *G10K 9/22* (2013.01)

(58) Field of Classification Search
None
See application file for complete search history.

(56) References Cited

U.S. PATENT DOCUMENTS 1,906,446 A * 5/1933 Clement .................... G01S 1/72
181/171
1,960,240 A * 5/1934 Clement .................... G01S 1/72
367/149
(Continued)

FOREIGN PATENT DOCUMENTS

CA  2000147 A1 * 4/1990
EP  2325674 A2 * 5/2011 ............. G01V 1/201
(Continued)

OTHER PUBLICATIONS

Magliocchetti, Mario. Improving the Performance of MiniCan Low Noise Hydrophones. Naval Postgraduate School Monterey CA, 2004. (Year: 2004).*
(Continued)

*Primary Examiner* — Isam A Alsomiri
*Assistant Examiner* — Jonathan D Armstrong
(74) *Attorney, Agent, or Firm* — Seckel IP, PLLC

(57) ABSTRACT

The invention relates to hydroacoustics and more specifically to hydroacoustic devices comprising, disposed in a single housing, a converter of liquid-medium oscillations and electrical signals, capable of receiving and/or transmitting hydroacoustic signals, the converter being disposed on a board which is connected to a switch cable for providing power and transmitting electrical signals, and may be used as a receiver and/or transmitter of hydroacoustic signals in
(Continued)

water. According to the invention, the housing of the to hydroacoustic device is formed by the outer surfaces of the converter and board, and by a protective material which coats all of said surfaces, said material allowing for a transmission of hydroacoustic oscillations and being capable of transitioning from a highly-elastic or viscous-flow state to a solid state. The achieved technical result consists in simplifying the design of the device.

9 Claims, 1 Drawing Sheet

(51) Int. Cl.
| | |
|---|---|
| G01S 1/72 | (2006.01) |
| G01S 3/80 | (2006.01) |
| G10K 9/22 | (2006.01) |
| G01S 1/74 | (2006.01) |
| G01S 7/521 | (2006.01) |

(56) References Cited

U.S. PATENT DOCUMENTS

| | | | | |
|---|---|---|---|---|
| 2,395,719 A * | 2/1946 | Bright | G01S 1/72 | 181/158 |
| 2,405,210 A * | 8/1946 | Inglis | G10K 11/006 | 367/171 |
| 2,613,261 A * | 10/1952 | Massa | B06B 1/0681 | 367/152 |
| 2,661,430 A * | 12/1953 | Hardway, Jr. | H01G 11/80 | 310/300 |
| 2,789,192 A * | 4/1957 | White | G01H 1/00 | 338/4 |
| 2,835,735 A * | 5/1958 | Moen | H04M 1/03 | 381/94.7 |
| 2,987,996 A * | 6/1961 | Morcom | F42B 22/00 | 102/406 |
| 3,263,209 A * | 7/1966 | Madison | B06B 1/0655 | 367/159 |
| 3,277,451 A * | 10/1966 | Parssinen | G01S 3/801 | 367/155 |
| 3,281,771 A * | 10/1966 | West | G01S 1/72 | 367/167 |
| 3,359,537 A | 12/1967 | Geil et al. | | |
| 3,363,228 A * | 1/1968 | Massa | H04R 17/005 | 367/161 |
| 3,464,057 A * | 8/1969 | Babikyan | G01S 1/72 | 367/141 |
| 3,671,928 A * | 6/1972 | Schultz | G01S 1/72 | 367/4 |
| 3,708,812 A * | 1/1973 | Yapoudjian | G10K 11/006 | 441/33 |
| 3,713,086 A | 1/1973 | Trott | | |
| 3,900,543 A * | 8/1975 | Davis | B29C 70/66 | 264/45.3 |
| 3,986,161 A * | 10/1976 | MacKellar | G01S 3/801 | 367/118 |
| 4,499,566 A * | 2/1985 | Abbott | B06B 1/0611 | 310/337 |
| 4,700,333 A * | 10/1987 | Massa | G10K 11/006 | 174/536 |
| 4,733,378 A * | 3/1988 | Pearce | G10K 11/006 | 181/110 |
| 4,769,795 A * | 9/1988 | Massa | B06B 1/0655 | 174/551 |
| 4,866,683 A * | 9/1989 | Phillips | B06B 1/0644 | 367/157 |
| 4,901,287 A * | 2/1990 | Hathaway | G01V 1/201 | 114/326 |
| 4,984,218 A * | 1/1991 | Ritter | G01V 1/201 | 114/244 |
| 5,022,012 A * | 6/1991 | Godfrey | G10K 11/008 | 367/15 |
| 5,033,032 A * | 7/1991 | Houghtaling | B06B 1/0688 | 367/152 |
| 5,155,709 A * | 10/1992 | Flanagan | G10K 9/121 | 29/25.35 |
| 5,739,600 A * | 4/1998 | Kobayashi | B06B 1/08 | 310/26 |
| 5,883,857 A * | 3/1999 | Pearce | G01V 1/201 | 367/20 |
| 6,108,267 A * | 8/2000 | Pearce | G01V 1/201 | 367/20 |
| 6,580,661 B1 | 6/2003 | Marschall et al. | | |
| 9,217,800 B2 * | 12/2015 | Pearce | G01V 1/201 | |
| 10,197,689 B1 * | 2/2019 | Szelag | G01H 11/08 | |
| 2006/0215489 A1 * | 9/2006 | Solheim | G01S 15/87 | 367/20 |
| 2012/0170422 A1 * | 7/2012 | Moon | G01V 1/188 | 367/166 |
| 2014/0328144 A1 * | 11/2014 | Huntley | G01V 1/166 | 367/188 |
| 2015/0063072 A1 * | 3/2015 | Deng | H01M 10/0587 | 367/134 |
| 2015/0294661 A1 * | 10/2015 | Sernit | G10K 11/008 | 367/173 |
| 2016/0211924 A1 * | 7/2016 | Deng | A01K 11/006 | |
| 2016/0299242 A1 * | 10/2016 | Nance | G01H 11/08 | |
| 2017/0031040 A1 * | 2/2017 | Goenner | B06B 1/06 | |

FOREIGN PATENT DOCUMENTS

| | | |
|---|---|---|
| JP | 2006311105 A * | 11/2006 |
| RU | 2 078 484 C1 | 4/1997 |
| RU | 2166840 C2 | 5/2001 |
| RU | 2 392 767 C1 | 6/2010 |
| RU | 2 393 643 C1 | 6/2010 |
| RU | 2 426 142 C1 | 8/2011 |

OTHER PUBLICATIONS

International Search Report and Written Opinion dated Aug. 25, 2016 issued in corresponding application No. PCT/RU2016/050009; w/ English partial translation and partial machine translation (7 pages).

Supplementary European Search Report and Written Opinion dated Jan. 21, 2019 in counterpart application No. EP16814800; in English (7 pages).

European Office Action dated Oct. 9, 2020 in counterpart application No. EP16814800; in English (total 12 pages) (D1-D2 and D3-D8 cited in the EP Office Action are not listed in this IDS since they were already listed in the IDSs filed Apr. 22, 2019 and Dec. 22, 2017, respectively).

European Office Action dated Oct. 15, 2021 in counterpart application No. EP16814800.5; in English (total 17 pages) (D1-D2, D3-D8 and D9 cited in the EP Office Action are not listed in this IDS since they were already listed in the IDSs filed Apr. 22, 2019, Dec. 22, 2017, and Jan. 6, 2021, respectively).

* cited by examiner

HYDROACOUSTIC DEVICE

TECHNICAL FIELD OF INVENTION

The invention relates to hydroacoustics and more specifically to hydroacoustic devices comprising, disposed in a single housing, a converter of liquid-medium oscillations and electrical signals, capable of receiving and/or transmitting hydroacoustic signals, the converter being disposed on a board which is connected to a switch cable for providing power and transmitting electrical signals, and may be used as a receiver and/or transmitter of hydroacoustic signals in a liquid medium for purposes of location sensing of the device by means of acoustic signals, manufacture of hydroacoustic receiving, transmitting and receiving/transmitting devices.

PRIOR ART

A known example of prior art is a hydroacoustic device comprising, disposed in a single housing, a converter of liquid-medium oscillations and electrical signals, capable of receiving and/or transmitting hydroacoustic signals, the converter being disposed on a board which is connected to a switch cable for providing power and transmitting electrical signals, see description to the Russian invention patent No 2426142, published in 2011.

The above device is the closest to the essence of the claimed invention and is assumed herein as a prototype of the claimed invention. It relates to the transponder beacon of hydroacoustic navigation system.

The drawback of the above device is its structural complexity related to the fact that all its elements are disposed in a single housing, said housing being a separate element. The housing consumes a certain amount of materials, besides, effort should be made to make said housing leakproof, as the device is designed for use in a liquid medium.

DISCLOSURE OF THE INVENTION

The present invention relies on this novel observation with the primary aim to offer a hydroacoustic device comprising, disposed in a single housing, a converter of liquid-medium oscillations and electrical signals, capable of receiving and/or transmitting hydroacoustic signals, the converter being disposed on a board which is connected to a switch cable for providing power and transmitting electrical signals, that serves at least to mitigate one of the aforementioned drawbacks, namely, to simplify the design of the device, which is the technical objective.

For the purpose of reaching the above objective, the housing of the hydroacoustic device is formed by the outer surfaces of the converter and board, and by a waterproof compound which coats all of said surfaces, said compound allowing for a transmission of the hydroacoustic oscillations.

This useful feature makes it possible to simplify the design of the device by eliminating the housing as a separate component and using the surface of the elements of the hydroacoustic device as said housing. To make the device leakproof when immersed in a liquid medium, said surfaces are fully coated in a protective material, namely, a special material like waterproof compound allowing for the transmission of the hydroacoustic oscillations. A number of materials can be selected for this purpose, for example, the materials that change their properties under the changing temperatures. For instance, they may be in a viscous flow state under high temperatures and harden when cooled.

A version of the invention includes thermoplastic is used as such protective material. This useful feature makes it possible to manufacture the protective coating for the hydroacoustic device from the thermoplastic. It is commonly known that the thermoplastic is a polymeric material which is capable to transit reversibly into a viscous flow state when heated. It is in a solid state under normal temperature.

A version of the invention includes thermoactive polymer resin that hardens under normal conditions to be used as such protective material. This useful feature makes it possible to manufacture the protective coating for the hydroacoustic device from the polymer resin. An example of such resin would be a compound which is in itself a thermoactive thermoplastic polymer resin (that hardens under normal conditions) and elastomer material with or without fillers and/or additives after hardening.

A version of the invention includes a synthetic elastomer used as such protective material. This useful feature makes it possible to manufacture the protective coating for the hydroacoustic device from the synthetic elastomer.

A priority version of the invention includes polyurethane used as such synthetic elastomer. This useful feature makes it possible to manufacture the protective coating for the hydroacoustic device from polyurethane, a synthetic material widely used in many industries as a substitute of rubber, caoutchouc, metal and plastic.

BRIEF DESCRIPTION OF DRAWINGS

Other distinguishing features and advantages of the invention are readily apparent from the description below which includes but is not limited to the following features, with reference to the figures attached:

FIGS. 1-5 show:

Figure 3:
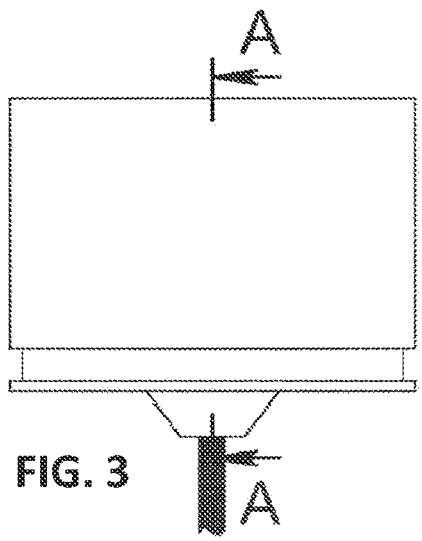
FIG. 3 represents schematically an external side view of a hydroacoustic device, in its cylindrical realization, according to the invention.
Figure 4:
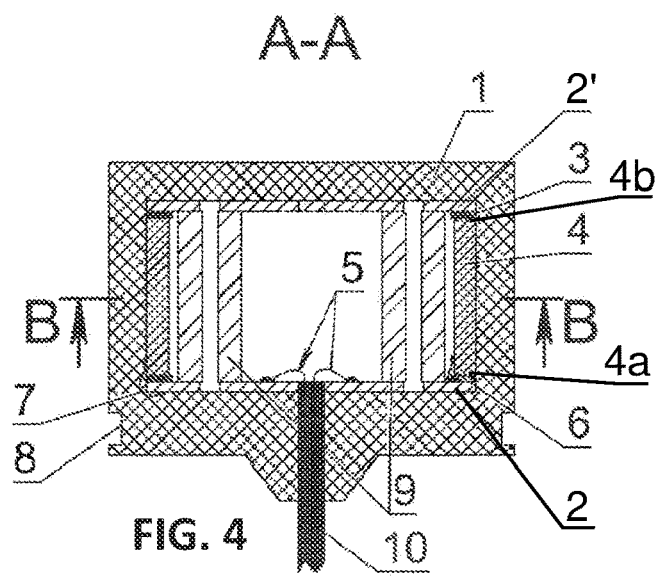
FIG. 4 represents schematically an A-A vertical section of the hydroacoustic device, in its cylindrical realization, according to the invention.
Figure 5:
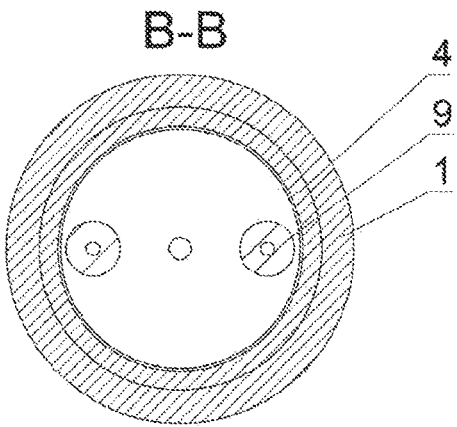
FIG. 5 represents schematically a B-B horizontal section of the hydroacoustic device, in its cylindrical realization, according to the invention.

1—protective material,

2—printed or wire circuit board with elements and/or receive/transmission path,

2'—additional printed or wire circuit board (embodiment of FIGS. 3-5)

3—rubber seal,

4—converter,

4a—lower base of the converter (embodiment of FIGS. 3-5),

4b—upper base of the converter (embodiment of FIGS. 3-5),

5—assignment for a switch cable for providing power and transmitting electrical signals, 6—interlayer metallization sealing,
7—external metallization sealing,
8—mounting slot,
9—support rod,
10—switch cable for providing power and transmitting electrical signals.

According to FIGS. 1-5, the hydroacoustic device comprises, disposed in a single housing, a converter 4 of liquid-medium oscillations and electrical signals, capable of receiving and/or transmitting hydroacoustic signals, the converter being disposed on a board 2 which is connected to a switch cable 10 for providing power and transmitting electrical signals. The housing of the hydroacoustic device is formed by the outer surfaces of the converter 4 and board 2, and by a protective material 1 which coats all of said surfaces, said material allowing for a transmission of the hydroacoustic oscillations and being a waterproof compound.

Figure 1:
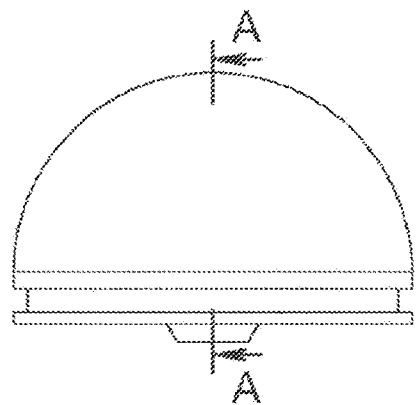
FIG. 1 represents schematically an external side view of a hydroacoustic device, in its hemispheric realization, according to the invention.
Figure 2:
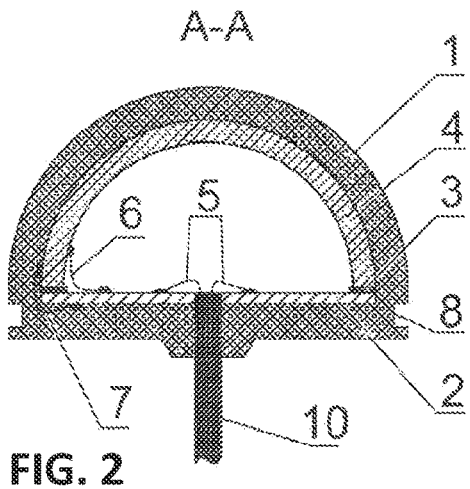
FIG. 2 represents schematically an A-A vertical section of the hydroacoustic device, in its hemispheric realization, according to the invention.

The converter 4 may be piezoceramic, magnetostriction and other converters of the liquid-medium oscillations and the electrical signals capable of receiving and/or transmitting hydroacoustic signals. Their shapes may be different: cylindrical, circular or hemispheric. FIGS. 1 and 2 represent examples of the converter 4 having an hemispherical form, while FIGS. 3, 4 and 5 represent examples of the converter 4 having a cylindrical form. In the embodiment of FIGS. 3-5, the printed or wire circuit board 2 is a first printed or wire circuit board, and there is a second printed or wire circuit board 2'. As visible in FIG. 4, the printed or wire circuit boards 2, 2' are disk-shaped and they have a same diameter equal to the diameter of the cylindrical-shaped converter 4. The lower base 4a of the cylindrical-shaped converter 4 is disposed on the first disk-shaped printed or wire circuit board 2, and the per base 4b of the cylindrical-shaped converter 4 is disposed on the second disk-shaped printed or wire circuit board 2'.

The board may be a printed or a wire circuit board containing a receive, transmission or combined receive/transmission signal path capable (in any configuration) of comprising the following:
power amplifier,
input pre-amplifier,
input and output band pass filters,
analog-to-digital converter,
digital-to-analog converter,
digital signal processor, etc.

At the same time, the design may include additional mounting elements (for example, for circular or cylindrical converter element: a support rod 9 positioned inside the cylindrical transmitter and additionally supporting the load from end surfaces of the cylinder). In the embodiment of FIGS. 3-5, as visible in FIG. 4, the support rod 9 extends from the inner surface of the first disk-shaped printed or wire circuit board 2 to the inner surface of the second disk-shaped printed or wire circuit board 2', the support rod 9 being positioned to additionally support a load resulting from an external pressure of the liquid medium to end surfaces of the single housing.

The hydroacoustic device is leakproof by coating it with a waterproof compound material, a thermoplastic, a vulcanization in a rubber housing or by any other method that ensures that the device is sufficiently insulated against the operating medium while retaining its acoustic transparency. In the embodiment of FIGS. 3-5, as visible in FIG. 4, the single waterproof housing of the hydroacoustic device includes:
the outer surface of the disk-shaped printed or wire circuit board 2,
the outer surface of the additional disk-shaped printed or wire circuit board 2',
the outer surface of the cylindrical-shaped converter 4, and the protective material 1 which coats all of the outer surface of the printed or wire circuit board 2, the outer surface of the additional printed or wire circuit board 2', and the outer surface of the cylindrical converter 4.

Embodiment of the Invention

Figure 6:
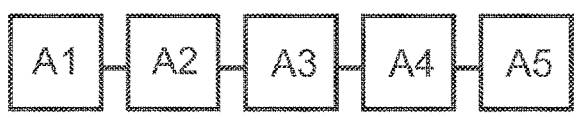
FIG. 6 represents operating stages of the hydroacoustic device according to the invention.

The hydroacoustic device is manufactured as follows. (A non-limiting example of embodiment is provided). According to the FIG. 6:

Stage A1. The housing of the hydroacoustic device is formed from the elements such as the converter 4 and the printed board 2, onto which the converter 4 is mounted.

Stage A2. The required electrical elements are placed onto the board.

Stage A3. The hydroacoustic device is connected to the switch cable 10.

Stage A4. An external surface of the hydroacoustic device is covered with the pre-heated protective material 1 to ensure that it is insulated against the liquid medium.

Stage A5. The protective material 1 is cooled and hardened.

Now the hydroacoustic device can be used in the liquid medium. A load resulting from an external pressure of the liquid medium is carried by the converter and also by other supporting elements. It is converted to electric signals, processed, if required, and transmitted via the switch cable 10.

The above optional embodiments of the invention are given herein by way of example and allow for new options or modifications for any eligible application. Some of the phases can be omitted or switched.

INDUSTRIAL APPLICABILITY

The claimed hydroacoustic device may be implemented by a person skilled in the art in practice and ensures that the claimed objectives are met after implementation. The opportunity for practical embodiment of the invention by a person skilled in the art results from the fact that for each attribute included in the claim as based on the description, an equivalent material embodiment is known, which leads to the conclusion that the invention meets the requirement of "industrial applicability" and "complete disclosure".

An industrial prototype of the hydroacoustic device in a hemispheric form (see FIGS. 1 and 2) as well as in a cylindrical form (see FIGS. 3, 4 and 5) has been manufactured, according to the invention, by the applicant "Underwater Communications and Navigation Laboratory" Limited Liability Company. Polyurethane was used as protective material.

Trial runs of the hydroacoustic device demonstrated that it was capable of:
reception of hydroacoustic signals,
transmission of hydroacoustic signals.
operation at the depth of 150 m.

The housing is acoustically transparent and leakproof for the liquid media.

This invention makes it possible to simplify the design of receivers, transmitters and receiver/transmitters by combining the converter and signal forming and/or processing equipment and by using them as structural support elements.

At the same time, all relevant signal conversions take place inside the item, thus lowering requirements for noise immunity and length of the switch cables. An additional economic benefit can be achieved by eliminating housings (metal, plastic or composite, etc.) from the design of the device, simplifying the device manufacturing process and simplifying switching and connecting hardware design for additional cost cuts.

Thus, the technical result achieved by means of the above effects consists in simplifying the design of the device.

The invention claimed is:

1. A hydroacoustic device adapted to be used in a liquid medium, the hydroacoustic device comprising, disposed in a single waterproof housing:
    a converter of liquid-medium oscillations and electrical signals, the converter being capable of receiving and/or transmitting hydroacoustic signals, the converter having a cylindrical shape,
    a first disk-shaped printed or wire circuit board comprising a receive/transmission signal path connected to a switch cable for providing power and transmitting electrical signals, a diameter of the first disk-shaped printed or wire circuit board being equal to a diameter of the cylindrical-shaped converter, the first disk-shaped printed or wire circuit board being adapted to be used as a structural support element of the single housing,
    a second disk-shaped printed or wire circuit board, the second disk-shaped printed or wire circuit board having a diameter equal to a diameter of the cylindrical-shaped converter, and
    a protective material allowing for a transmission of hydroacoustic oscillations and being a waterproof compound,
    wherein the cylindrical-shaped converter comprises a first base disposed on the first disk-shaped printed or wire circuit board, and a second base disposed on the second disk-shaped printed or wire circuit board,
    wherein each of the first disk-shaped printed or wire circuit board and the second disk-shaped printed or wire circuit board comprises a first outer surface oriented away from the converter and a second inner surface oriented toward the cylindrical-shaped converter,
    wherein the cylindrical-shaped converter comprises a first inner surface oriented toward the first and second disk-shaped printed or wire circuit boards and a second outer surface oriented away from the first and second disk-shaped printed or wire circuit boards,
    wherein the single waterproof housing of the hydroacoustic device comprises:
        the first outer surface of the first disk-shaped printed or wire circuit board,
        the first outer surface of the second disk-shaped printed or wire circuit board,
        the second outer surface of the cylindrical-shaped converter, and
        the protective material which coats all of the first outer surface of the first printed or wire circuit board, the first surface of the second printed or wire circuit board, and the second outer surface of the cylindrical converter,
    wherein the hydroacoustic device comprises a support rod positioned only inside the single housing between the first inner surface of the converter and the second inner surface of the board and extending from the second inner surface of the first disk-shaped printed or wire circuit board to the second inner surface of the second disk-shaped printed or wire circuit board, the support rod being positioned to additionally support a load resulting from an external pressure of the liquid medium to end surfaces of the single housing.

2. The hydroacoustic device according to claim 1, wherein the device comprises an interlayer metallization sealing disposed between the first inner surface of the cylindrical-shaped converter and the second inner surface of each of the first and second disk-shaped printed or wire circuit boards.

3. The hydroacoustic device according claim 2, wherein the single housing comprises an external metallization sealing disposed between the second outer surface of each of the first and second disk-shaped printed or wire circuit boards and the second outer surface of the cylindrical-shaped converter and, the external metallization sealing being opposite to the interlayer metallization sealing.

4. The hydroacoustic device according to claim 1, wherein each of the first and second disk-shaped boards is a printed board.

5. The hydroacoustic device according to claim 1, wherein each of the first and second disk-shaped boards is a wire circuit board.

6. The hydroacoustic device according to claim 1, wherein the device is capable of operating at a 150 m depth of the liquid medium.

7. The hydroacoustic device according to claim 1, wherein the first disk-shaped printed or wire circuit board comprises at least one of following apparatuses: (a) power amplifier; (b) input pre-amplifier; (c) input and output band pass filters; (d) analog-to-digital converter; (e) digital-to-analog converter; (f) digital signal processor.

8. The hydroacoustic device according to claim 1, wherein the single housing comprises a rubber seal introduced between the cylindrical-shaped converter and the first disk-shaped printed or wire circuit board.

9. The hydroacoustic device according to claim 1, wherein the single housing comprises a mounting slot formed into the protective material.

* * * * *